United States Patent
Kim

(10) Patent No.: US 11,820,078 B2
(45) Date of Patent: Nov. 21, 2023

(54) 3D PRINTING MACHINE

(71) Applicants: HYUNDAI MOTOR COMPANY, Seoul (KR); KIA CORPORATION, Seoul (KR)

(72) Inventor: Gyung Bok Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 16 days.

(21) Appl. No.: 17/695,078

(22) Filed: Mar. 15, 2022

(65) Prior Publication Data
US 2023/0018192 A1    Jan. 19, 2023

(30) Foreign Application Priority Data
Jul. 14, 2021 (KR) .................. 10-2021-0092402

(51) Int. Cl.
| | |
|---|---|
| B29C 64/241 | (2017.01) |
| B33Y 30/00 | (2015.01) |
| D01D 5/08 | (2006.01) |
| B29C 64/245 | (2017.01) |
| B29C 64/236 | (2017.01) |
| B29K 307/04 | (2006.01) |

(Continued)

(52) U.S. Cl.
CPC .......... B29C 64/241 (2017.08); B29C 64/236 (2017.08); B29C 64/245 (2017.08); B33Y 30/00 (2014.12); D01D 5/08 (2013.01); B29K 2101/12 (2013.01); B29K 2307/04 (2013.01); B29K 2309/08 (2013.01)

(58) Field of Classification Search
CPC .................................................. B29C 64/118
See application file for complete search history.

(56) References Cited

U.S. PATENT DOCUMENTS

| | | | |
|---|---|---|---|
| 2016/0271876 A1* | 9/2016 | Lower ................... | B33Y 10/00 |
| 2017/0151728 A1 | 6/2017 | Kunc et al. | |
| 2018/0126620 A1* | 5/2018 | Talgorn ................. | B33Y 40/00 |

(Continued)

FOREIGN PATENT DOCUMENTS

| | | |
|---|---|---|
| JP | 6097898 B2 | 3/2017 |
| KR | 2015-0144206 A | 12/2015 |
| KR | 10-2185872 B1 | 12/2020 |

OTHER PUBLICATIONS polymerdatabase.com (https://polymerdatabase.com/Commercial%20Polymers/PS2.html) (Year: 2015).*

(Continued)

*Primary Examiner* — Joseph S Del Sole
*Assistant Examiner* — Ariella Machness
(74) *Attorney, Agent, or Firm* — MCDONNELL BOEHNEN HULBERT & BERGHOFF LLP

(57) ABSTRACT

A 3D printing machine includes a first spinning part moving in directions of three axes, i.e., X-, Y-, and Z-axes, to melt and spin a base material; and a second spinning part moving along a moving direction of the first spinning part to spin reinforcing fiber onto an upper surface of the spun base material, and moving clockwise or counterclockwise so that the reinforcing fiber is spun onto the upper surface of the base material at a moment when the first spinning part changes a moving direction thereof to the X- or Y-axis direction.

12 Claims, 3 Drawing Sheets

(51) Int. Cl.
 *B29K 101/12* (2006.01)
 *B29K 309/08* (2006.01)

(56) References Cited

U.S. PATENT DOCUMENTS

2018/0370130 A1* 12/2018 Duffner ................ B29C 64/165
2020/0130257 A1* 4/2020 Deaville ............... B29C 64/165

OTHER PUBLICATIONS

Kazmer et al. ("Design and Evaluation of General Purpose, Barrier, and Multichannel Plasticating Extrusion Screws", Polymer Engineering and Science, 2020, 60(4), 752-764) (Year: 2020).*

* cited by examiner

3D PRINTING MACHINE

CROSS REFERENCE TO RELATED APPLICATION

The present application claims priority to Korean Patent Application No. 10-2021-0092402, filed Jul. 14, 2021, the entire contents of which are incorporated herein for all purposes by this reference.

BACKGROUND

Field

The present disclosure relates to a 3D printing machine. More particularly, the disclosure relates to a 3D printing machine in which reinforcing fiber is spun on an upper surface of a spun base material, so it is possible to secure stackability even if a base material having the viscosity of $10^6$ Pa·s at a melting point is used, and the reinforcing fiber is used as a reinforcing material, so it is possible to obtain an output object having improved properties.

Description of the Related Art

A 3D printing machine is a printer capable of obtaining a 3D output object, and is configured to reconstruct the design of a digitized 3D product into a continuous 2D section, print the 2D section one by one, and then stack 2D sections, thus outputting a 3D product.

The 3D printing machine may be classified into several types according to a printing method. A FDM (Fused Deposition Modeling) method applies heat to a solid base material to melt the material, spins the molten material via a nozzle, and then performs a stacking operation.

The FDM method is advantageous in that the cost of equipment and the cost of material are low, and conventional thermoplastic plastics may be used without being modified so the selection of the material is free, and an applicable field is wide.

However, the material should satisfy the following conditions to be used for FDM printing.

First, a molten material should rheologically show shear thinning. In other words, the material is preferably non-Newtonian fluid. The reason is because a Newtonian fluid has a constant viscosity regardless of a shear rate, so the extrusion of the Newtonian fluid is not possible. A shear thinning degree may be usually expressed as an index. The shear thinning index may be obtained as a fraction in a logarithmic function of the shearing force and viscosity of a material. When the shear thinning index is 1 or more, the material shows the behavior of a Newtonian fluid. The shear thinning index may preferably range from 0 to 0.6. The reason is because the viscosity of the material is abruptly changed depending on the shearing force when the shear thinning index is 0 or less, so it is difficult to optimize the extrusion temperature of the material, RPM, and the like in the 3D printing machine.

Second, the molten material should have the viscosity of $10^6$ Pa·s or more. To be more specific, before a next layer is stacked on the molten material, the molten material should be cured to withstand the pressure of the stacked layer. The viscosity affects such a nature. For example, when resin having a viscosity less than $10^3$ Pa·s at the time of melting, such as nylon, PEEK, or PC continues to be stacked, a lower end thereof does not withstand the weight of the stacked layer and collapses due to its own weight, so there is a limit to manufacture an output object using this material. A low-viscosity material can secure stackability by improving an initial viscosity through quick cooling, but causes deterioration of quality due to post-deformation, deterioration of properties of a stacked material, etc.

Therefore, there is a need for a 3D printing machine that can secure stackability even in the case of using a low-viscosity material, and improve properties, thus improving the quality of an output object.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a 3D printing machine including a first spinning part moving in directions of three axes, i.e., X-, Y-, and Z-axes (in an X direction, a Y direction, and a Z direction) to melt and spin a base material, and a second spinning part moving along a moving direction of the first spinning part to spin reinforcing fiber onto an upper surface of the spun base material, and moving clockwise or counterclockwise so that the reinforcing fiber is spun onto the upper surface of the base material at a moment when the first spinning part changes a moving direction thereof to the X- or Y-axis direction.

In order to achieve the objective of the present disclosure, the present disclosure provides a 3D printing machine including a first spinning part moving in directions of three axes, i.e., X-, Y-, and Z-axes to melt and spin a base material; and a second spinning part moving along a moving direction of the first spinning part to spin reinforcing fiber onto an upper surface of the spun base material, and moving clockwise or counterclockwise so that the reinforcing fiber is spun onto the upper surface of the base material at a moment when the first spinning part changes a moving direction thereof to the X- or Y-axis direction.

A first installation space may be provided on a side of the first spinning part to install the second spinning part therein, so the second spinning part may be installed in the first installation space.

At a moment when the first spinning part changes the moving direction thereof into the X- or Y-axis direction, the first installation space may be shifted clockwise or counterclockwise to move the second spinning part clockwise or counterclockwise and thereby allow the second spinning part to spin the reinforcing fiber to the upper surface of the base material.

A heating part may be provided on a side of the first spinning part to supply heated air to the spun base material and the reinforcing fiber, and may be moved clockwise or counterclockwise to supply heated air to the spun base material and the reinforcing fiber at a moment when the first spinning part changes the moving direction thereof into the X- or Y-axis direction.

A second installation space may be provided on the side of the first spinning part to install the heating part therein, so the heating part may be installed in the second installation space.

At a moment when the first spinning part changes the moving direction thereof into the X- or Y-axis direction, the second installation space may be shifted clockwise or counterclockwise to move the heating part clockwise or counterclockwise and thereby allow the heating part to supply the heated air to the spun base material and the reinforcing fiber.

A distance between the heating part and the first spinning part may be longer than a distance between the second spinning part and the first spinning part.

A temperature of the heated air may be the same as the temperature of a melting point of the base material.

The 3D printing machine may further include a bed on which the base material spun by the first spinning part is seated.

The 3D printing machine may further include a vibrator provided on a bottom of the bed to vibrate the bed.

The vibrator may vibrate in the Z-axis direction.

The base material may be thermoplastic plastic resin.

A viscosity of the base material at the melting point may be $10^6$ Pa·s or less.

The reinforcing fiber may be carbon fiber or glass fiber.

A 3D printing machine according to the present disclosure is advantageous in that an output and stackability are secured even if a low-viscosity polymeric material is used, so an output object that does not collapse by its own weight can be obtained, and an output object having improved properties can be obtained even if a low-viscosity material is used because reinforcing fiber is used together with the low-viscosity material.

BRIEF DESCRIPTION OF THE FIGURES

The above and other objectives, features, and other advantages of the present disclosure will be more clearly understood from the following detailed description when taken in conjoint with the accompanying drawings, in which.

DETAILED DESCRIPTION

Figure 1:
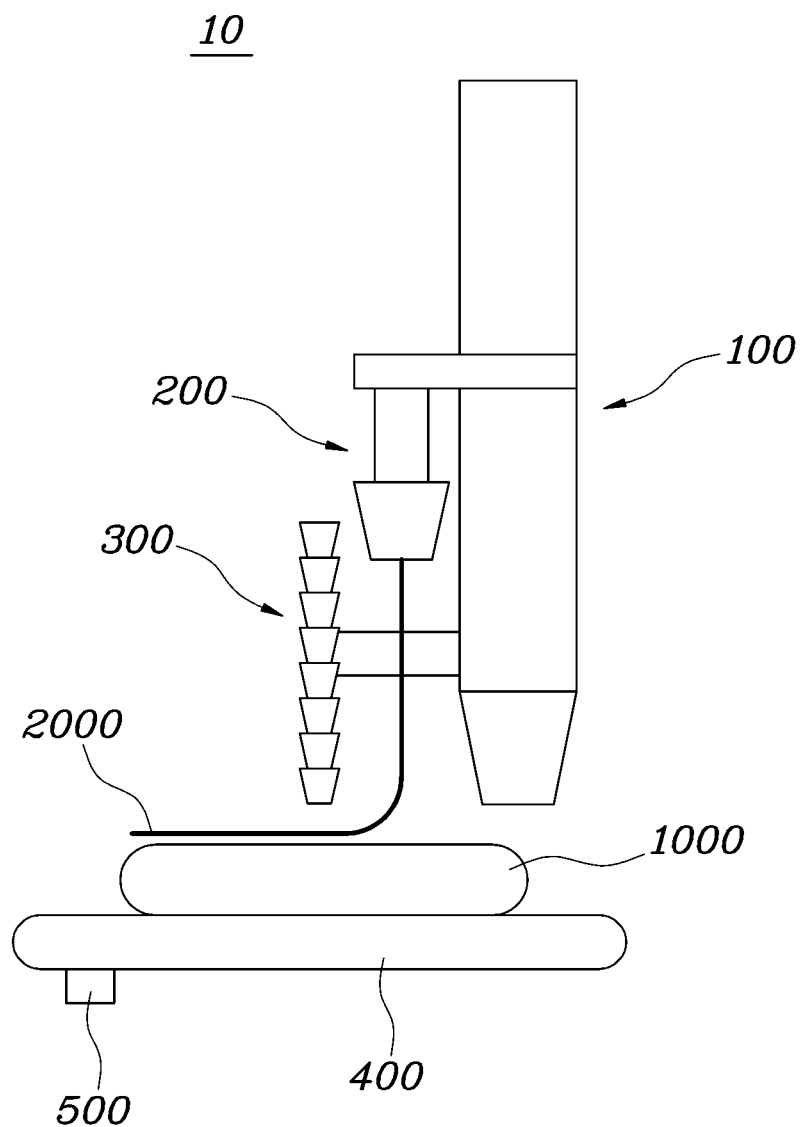
FIGS. 1 and 3 illustrate a 3D printing machine according to an embodiment of the present disclosure.

Hereinafter, embodiments of the present disclosure will be described in detail with reference to the accompanying drawings. When the detailed description of known technology is not helpful in understanding the gist of the disclosure, this description will be omitted. The technical spirit of the present disclosure is not limited thereto, and may be changed in various ways by those skilled in the art.

A material that may be used as a base material of a FDM 3D printing machine may have the shear thinning index ranging from 0 to 1, preferably 0 to 0.6. In case that the index exceeds 1, the material shows the behavior of Newtonian fluid, so a viscosity depends on only a change in temperature and thereby the extrusion of the material is not. In case that the index is less than 0, the viscosity of the material is abruptly changed by shearing force, so it is difficult to optimize the extrusion conditions of the material in the FDM 3D printing machine. Further, in order to prevent the material from collapsing by its own weight when the material is stacked, the material should have a viscosity exceeding $10^6$ Pa·s at a melting point thereof.

As such, the viscosity is an important factor when selecting a material that may be used as the base material of the FDM 3D printing machine. A low-viscosity material is problematic because it collapses by its own weight as layers are stacked, and the strength of a finished output object is also weak.

The present disclosure is to provide a 3D printing machine, in which an output and stackability are secured even if a low-viscosity material is used, so an output object that does not collapse by its own weight can be obtained, and an output object having improved properties can be obtained even if the low-viscosity material is used because reinforcing fiber is used together with the low-viscosity material.

In order to accomplish the above objectives, a 3D printing machine 10 according to the present disclosure includes a first spinning part 100 that moves in directions of three axes, i.e., X-, Y-, and Z-axes, to melt and spin a base material 1000, and a second spinning part 200 that moves along a moving direction of the first spinning part 100 to spin reinforcing fiber 2000 onto an upper surface of the spun base material 1000, and moves clockwise or counterclockwise so that the reinforcing fiber is spun onto the upper surface of the base material at a moment when the first spinning part 100 changes its moving direction to the X- or Y-axis direction.

Figure 2:
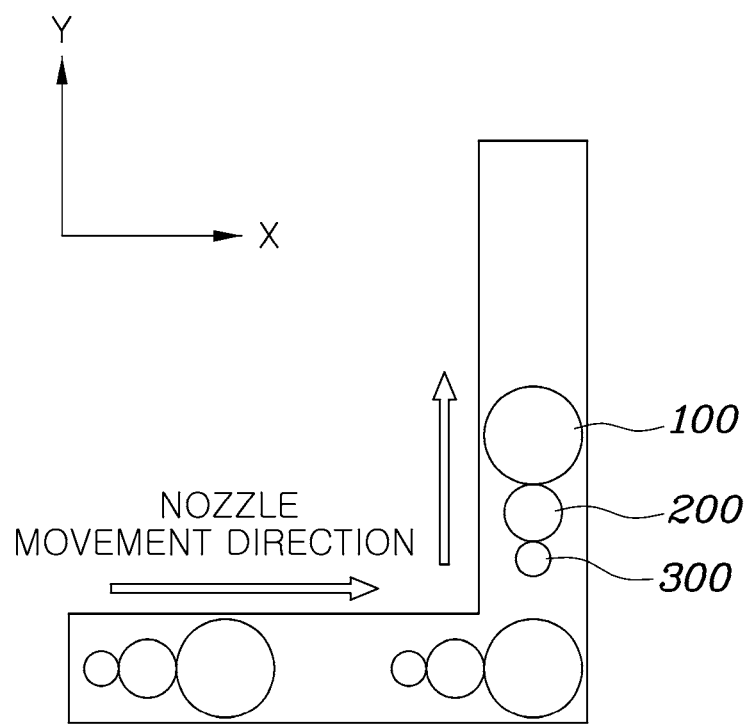
FIG. 2 illustrates the movement of the 3D printing machine according to an embodiment of the present disclosure.
Figure 3:
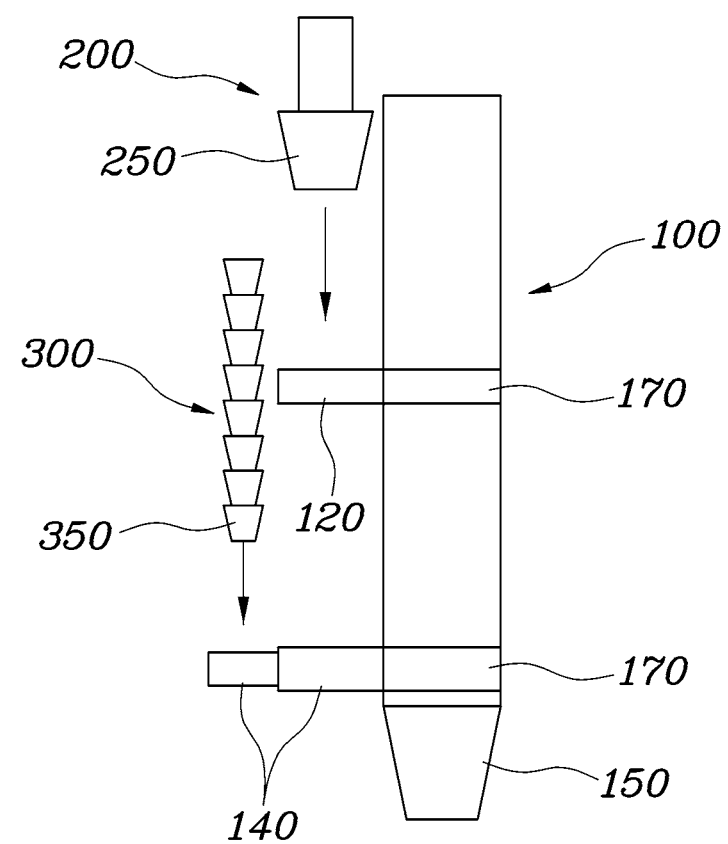

To be more specific, referring to FIGS. 1 to 3, the 3D printing machine 10 includes the first spinning part 100 that spins the molten base material 1000, and the second spinning part 200 that spins the reinforcing fiber 2000 onto the upper surface of the spun base material 1000. The first spinning part 100 moves along the X-, Y-, and Z-axis, and a nozzle 150 of the first spinning part spins and stacks the base material. In this specification, the terms "X-axis" (or X direction) and "Y-axis" (or Y direction) refer to a horizontal axis or direction and a vertical axis or direction parallel to a ground, and the term "Z-axis" (or Z direction) refers to an axis or direction perpendicular to the ground. The first spinning part 100 itself may move in the direction of the X-, Y-, or Z-axis, or a bed 400 that will be described below may move in the direction of the X-, or Y-axis and the first spinning part 100 may move in the direction of the Z-axis to perform a relative motion with the bed, or the bed 400 may move in the direction of the Z-axis to perform a relative motion with the first spinning part and the first spinning part 100 may move in the direction of the X-, or Y-axis direction to spin the molten base material. In other words, in this specification, the movement of the first spinning part 100 is a concept including relative movement as well as absolute movement.

The second spinning part 200 is configured to spin the reinforcing fiber 2000 to the upper surface of the molten base material 1000 spun by the first spinning part 100. A nozzle 250 of the second spinning part spins the reinforcing fiber 2000. The reinforcing fiber 2000 may be carbon fiber or glass fiber. The second spinning part immediately spins the reinforcing fiber 2000 to the upper surface of the molten base material 1000. The spun reinforcing fiber 2000 may be properly impregnated into the molten base material 1000 to cure the base material, thus improving the properties of the base material.

Meanwhile, a method of directly mixing and then spinning the base material and the reinforcing fiber can improve bending strength or tensile strength, but has limitations in improving rigidity such as elongation or impact strength, and especially the anisotropy of properties between the direction of the X- or Y-axis and the direction of the Z-axis is increased. In contrast, a method of separately spinning the base material and the reinforcing fiber and then impregnating the reinforcing fiber into the base material can overcome the above-mentioned limitations, so output and stackability can be secured.

In particular, according to the present disclosure, even if thermoplastic plastic resin having the low viscosity of $10^6$ Pa·s or less at a melting point is used as the base material, it is possible to make an output object while securing output and stackability in the FDM method.

Meanwhile, unless the position of the second spinning part 200 is not changed in response to the movement of the first spinning part 100 when the first spinning part 100 changes its direction into the direction of the X- or Y-axis, the reinforcing fiber 2000 is spun not to the upper surface of the molten base material but to the bed 400 or a previously cured base material, and thereby the second spinning part 200 moves clockwise or counterclockwise in response to the movement of the first spinning part 100.

To be more specific, the second spinning part 200 may be provided on a side of the first spinning part 100, and a first installation space 120 may be provided on the side of the first spinning part 100 to allow the second spinning part 200 to be installed in the first installation space 120. In other words, at a moment when the first spinning part 100 changes its moving direction into the direction of the X- or Y-axis, the first installation space 120 may be shifted clockwise or counterclockwise to move the second spinning part 200 clockwise or counterclockwise and thereby allow the second spinning part 200 to spin the reinforcing fiber to the upper surface of the base material. In this regard, a bearing 170 may be provided on the first spinning part 100, and the bearing 170 and the first installation space 120 may be connected to facilitate the clockwise or counterclockwise rotation of the first installation space 120.

Meanwhile, a heating part 300 may be provided on a side of the first spinning part 100 to supply heated air to the spun base material 1000 and the reinforcing fiber 2000, and may be moved clockwise or counterclockwise to supply heated air to the spun base material 1000 and the reinforcing fiber 2000 at a moment when the first spinning part 100 changes its moving direction into the X- or Y-axis direction.

To be more specific, in case that the reinforcing fiber is non-uniformly impregnated into the molten base material, pores may occur at an interface between the base material and the reinforcing fiber. The pores may cause cracks in an output object, non-uniform impregnation of reinforcing fiber, and problems in the process of stacking the base material. In particular, a frequency at which the pores occur increases as the viscosity decreases, in a material having the viscosity of 103 Pa·s or less at a melting point.

The heating part 300 is configured to remove the pores, and a nozzle 350 of the heating part supplies heated air to the spun base material and the reinforcing fiber to soften the base material that is being cured and facilitate the movement of air in the base material, thus removing the pores. Preferably, the temperature of the air supplied by the heating part 300 is the same as the temperature of the nozzle 150 of the first spinning part.

Similarly to the second spinning part 200, the heating part 300 moves clockwise or counterclockwise as the first spinning part 100 changes its moving direction into the direction of the X- or Y-axis. A second installation space 140 may be provided on the side of the first spinning part 100 to allow the heating part 300 to be installed therein, so the heating part 300 may be installed in the second installation space 140. At a moment when the first spinning part 100 changes its moving direction into the direction of the X- or Y-axis, the second installation space 140 may be shifted clockwise or counterclockwise to move the heating part 300 clockwise or counterclockwise and thereby allow the heating part 300 to supply the heated air to the spun base material 1000 and the reinforcing fiber 2000. In this regard, a bearing 170 may be provided on the first spinning part 100, and the bearing 170 and the second installation space 140 may be connected to facilitate the clockwise or counterclockwise rotation of the second installation space 140.

Meanwhile, a distance between the heating part 300 and the first spinning part 100 is longer than a distance between the second spinning part 200 and the first spinning part 100. The reason is because the base material should be laid on a lowermost layer, the reinforcing fiber should be spun and impregnated to the upper surface of the base material, and the heated air should be supplied to remove the pores between the base material and the reinforcing fiber.

The 3D printing machine 10 may further include the bed 400 on which the base material spun by the first spinning part 100 is seated. A vibrator 500 may be provided on a bottom of the bed 400 to vibrate the bed 400. The vibrator 500 vibrates in the Z-axis direction, applies an additional shearing force to the molten base material spun onto the cured base material, thus securing stackability, and helps the reinforcing fiber spun from the second spinning part 200 to be perfectly impregnated into the molten base material by the additional shearing force.

As described above, the present disclosure provides a 3D printing machine, in which an output and stackability are secured even if a low-viscosity polymeric material is used, so an output that does not collapse by its own weight can be obtained, and an output having improved properties can be obtained even if a low-viscosity material is used because reinforcing fiber is used together with the low-viscosity material.

Although the present disclosure was described with reference to specific embodiments shown in the drawings, it is apparent to those skilled in the art that the present disclosure may be changed and modified in various ways without departing from the scope of the present disclosure, which is described in the following claims.

The invention claimed is:

1. A 3D printing machine, comprising:
a first spinning part configured to move in an X direction, a Y direction, and a Z direction to melt and spin a base material;
a second spinning part configured to move along a moving direction of the first spinning part to spin reinforcing fiber onto an upper surface of the spun base material, and configured to move clockwise or counterclockwise so that the reinforcing fiber is spun onto the upper surface of the base material when the first spinning part changes a moving direction to the X direction or the Y direction; and
a heating part positioned on a side of the first spinning part, the heating part being configured to supply heated air to the spun base material and the reinforcing fiber, wherein the heating part is configured to move clockwise or counterclockwise to supply heated air to the spun base material and the reinforcing fiber when the first spinning part changes the moving direction into the X direction or the Y direction;
wherein a distance between the heating part and the first spinning part is longer than a distance between the second spinning part and the first spinning part.

2. The 3D printing machine of claim 1, wherein the first spinning part comprises a first installation space is positioned on a side, the first installation space being configured to receive the second spinning part.

3. The 3D printing machine of claim 2, wherein, when the first spinning part changes the moving direction into the X direction or the Y direction, the first installation space is shifted clockwise or counterclockwise to move the second spinning part clockwise or counterclockwise, and to allow the second spinning part to spin the reinforcing fiber to the upper surface of the base material.

4. The 3D printing machine of claim 1, further comprising a second installation space positioned on the side of the first spinning part, wherein the heating part is installed in the second installation space.

5. The 3D printing machine of claim 4, wherein, when the first spinning part changes the moving direction into the X direction or the Y direction, the second installation space is shifted clockwise or counterclockwise to move the heating part clockwise or counterclockwise, and allow the heating part to supply the heated air to the spun base material and the reinforcing fiber.

6. The 3D printing machine of claim 1, wherein a temperature of the heated air is the same as a temperature of a melting point of the base material.

7. The 3D printing machine of claim 1, further comprising:
    a bed on which the base material spun by the first spinning part is seated.

8. The 3D printing machine of claim 7, further comprising:
    a vibrator provided on a bottom of the bed configured to vibrate the bed.

9. The 3D printing machine of claim 8, wherein the vibrator vibrates in the Z direction.

10. The 3D printing machine of claim 1, wherein the base material is a thermoplastic resin.

11. The 3D printing machine of claim 10, wherein a viscosity of the base material at the melting point is 106 Pa·s or less.

12. The 3D printing machine of claim 1, wherein the reinforcing fiber is carbon fiber or glass fiber.

* * * * *